(12) United States Patent
Schneider et al.

(10) Patent No.: US 10,939,331 B2
(45) Date of Patent: Mar. 2, 2021

(54) INFORMATION CENTRIC NETWORK HETEROGENOUS WIRELESS SWITCHING

(71) Applicant: Intel Corporation, Santa Clara, CA (US)

(72) Inventors: Klaus Schneider, Tucson, AZ (US); Srikathyayani Srikanteswara, Portland, OR (US); Maruti Gupta Hyde, Portland, OR (US); Ravikumar Balakrishnan, Hillsboro, OR (US); Gabriel Arrobo Vidal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 16/370,098

(22) Filed: Mar. 29, 2019

(65) Prior Publication Data

US 2019/0230566 A1    Jul. 25, 2019

Related U.S. Application Data

(60) Provisional application No. 62/780,769, filed on Dec. 17, 2018.

(51) Int. Cl.
| | |
|---|---|
| *H04W 36/00* | (2009.01) |
| *H04W 36/12* | (2009.01) |
| *H04W 36/22* | (2009.01) |
| *H04W 36/30* | (2009.01) |
| *H04W 40/12* | (2009.01) |
| *H04L 12/707* | (2013.01) |
| *H04W 36/02* | (2009.01) |

(52) U.S. Cl.
CPC ......... *H04W 36/0022* (2013.01); *H04L 45/22* (2013.01); *H04W 36/02* (2013.01); *H04W 36/12* (2013.01); *H04W 36/22* (2013.01); *H04W 36/30* (2013.01); *H04W 40/12* (2013.01)

(58) Field of Classification Search
CPC ................................................ H04W 36/0022
See application file for complete search history.

(56) References Cited

U.S. PATENT DOCUMENTS

| | | | | |
|---|---|---|---|---|
| 2011/0007713 A1* | 1/2011 | Kobayashi | ............ | H04W 28/06 370/332 |
| 2013/0016695 A1* | 1/2013 | Ravindran | ............ | H04L 67/327 370/331 |

(Continued)

OTHER PUBLICATIONS

Hassan Sinky et al., Proactive Multi-Path TCP for Seamless Handoff in Heterogeneous Wireless Access Networks, Jul. 2016, IEEE Transactions on Wireless Communications, vol. 15 Issue 7, pp. 4754-4764 (Year: 2016).*

*Primary Examiner* — Jason E Mattis
(74) *Attorney, Agent, or Firm* — Schwegman Lundberg & Woessner, P.A.

(57) ABSTRACT

Systems and techniques for information centric network (ICN) heterogeneous wireless switching are described herein. A handover event, that includes an indication for a device to switch from a first wireless link to a second wireless link, may be detected. A forwarding interest base (FIB) table may be modified to route interest packets to the second wireless link. Although the device has switched to route new out-going interest packet to the second wireless link, the device accepts data packets on both the first wireless link and the second wireless link.

24 Claims, 4 Drawing Sheets

(56) References Cited

U.S. PATENT DOCUMENTS

| | | | |
|---|---|---|---|
| 2013/0039249 A1* | 2/2013 | Ravindran | H04W 36/026 370/312 |
| 2014/0086048 A1* | 3/2014 | Jang | H04L 1/1809 370/229 |
| 2014/0192717 A1* | 7/2014 | Liu | H04L 67/16 370/328 |
| 2016/0234738 A1* | 8/2016 | Yan | H04W 36/08 |

* cited by examiner

ICN is an umbrella term for a new networking paradigm

INFORMATION CENTRIC NETWORK HETEROGENOUS WIRELESS SWITCHING

PRIORITY APPLICATION

This application claims the benefit or priority to U.S. Provisional Application Ser. No. 62/780,769, filed Dec. 17, 2013, which is incorporated herein by reference in its entirety.

TECHNICAL FIELD

Embodiments described herein generally relate to computer networking and more specifically to information centric network (ICN) heterogeneous wireless switching.

BACKGROUND

ICN is an umbrella term for a new networking paradigm in which information itself is named and requested from the network instead of hosts (e.g., machines that provide information). To retrieve content, a device requests named content from the network itself. The content request may be called an interest and is transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source of the interest by following the traces of the interest left in the network devices.

Fifth generation cellular standards (e.g., as those promulgated by the Third Generation Partnership Project (3GPP) or the European Telecommunications Standards Institute (ETSI)) include additional radio bands for various purposes. One of these radio access network (RAN) technologies includes ultra-wide band (UWB) communications that use millimeter wave (mmWave) frequencies (e.g., between 30 and 300 gigahertz (GHz)), or the use of millimeter wave frequencies on their own. mWave bands may have better throughput than lower frequency carrier waves, but may suffer from higher path-loss in the environment (e.g., atmosphere, traversing structures, etc.) as well as being more sensitive to other types of radio frequency (RF) interferences. The mmWave signal is also prone to blockages from obstructions.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
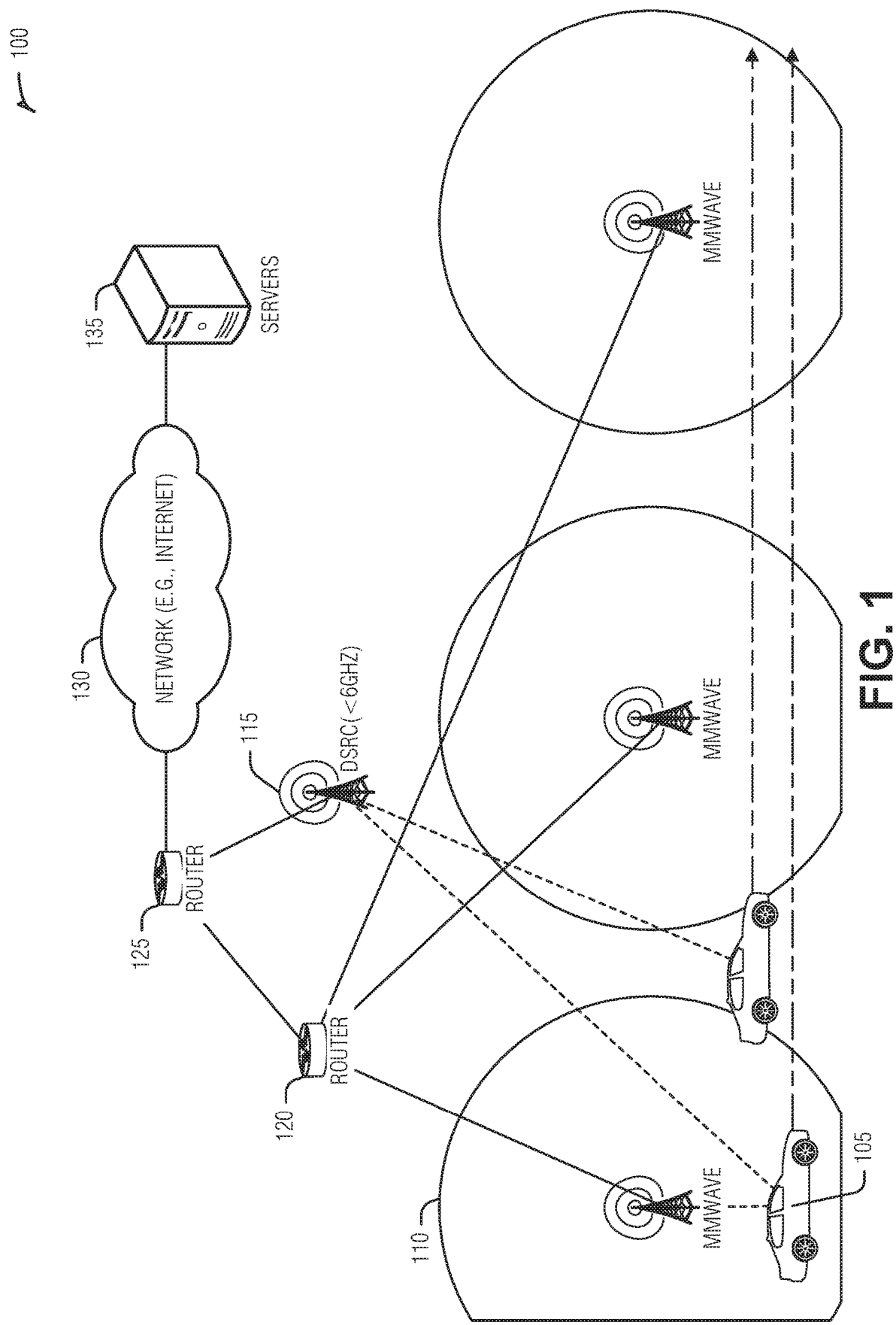
FIG. 1 is a block diagram of an example of an environment including a system for ICN heterogeneous wireless switching, according to an embodiment.

Networks with a radio frequency between 30 and 300 GHz, referred to as mmWave, are becoming increasingly popular as 5G systems are developed and deployed. As noted above, these networks may provide very high data throughput but are also prone to poor performance in certain conditions, such as path-loss due to people, cars, walls, etc. Moreover, even with line-of-sight, these bands experience significant path-loss in the atmosphere, limiting their range. Thus, mmWave networks are most often used in combination with lower-frequency (e.g., frequency less than 6 GHz) networks. These lower frequency networks often provide a much longer range that is more robust to physical interference (e.g., buildings) at the cost of a lower throughput. Heterogeneous wireless networks—networks that mix mmWave with lower frequency bands—are being deployed to enable choice between the throughput of mmWave and the robustness of lower frequency RAN technologies. Often, devices participating in these heterogeneous networks include multiple radios using differing air interface access technologies, such as cellular (e.g., Long Term evolution (LTE) and 5G) and wireless local area network (WLAN) (e.g., IEEE 802.11 family of standards), among others.

To obtain the greatest performance (e.g., throughput) of heterogeneous networks, a mobile wireless device may frequently switch between the different radio access technologies depending on the stability or availability of the various links. With higher frequencies, such as mmWave, and the presence of a large number of heterogeneous networks, this switching is becoming more commonplace. Often the involved networks are of a different type (e.g. WLAN and cellular). In this case, often after switching, the device will have to receive a new IP address, set up a new transport connection (e.g. TCP), and have the application restart its previous task (e.g., downloading a file). All of these procedures negatively impact the device's performance by adding additional latency for each handover operation. This may leave links underutilized. Further, the packets that were in-flight in the old link often get dropped and have to be re-transmitted over the new link once the new link is established. Consequently, network switching results in additional latency and loss of throughput.

Current IP networks, even when with access to multiple network interfaces, usually only use one network (e.g., interface) at a time. This is generally dictated by IP routing table design, which usually restricts itself to a single default gateway per end-device. Although there are some technologies that allow a device to use multiple links so as to allow traffic to flow on multiple links simultaneously, these technologies have not been widely deployed as they assume the end points—such as an IEEE 802.11 access point (AP), an LTE eNB, and a 5G gNB—are either co-located or in communication with each other—e.g., using protocols such as LTE-WiFi Aggregation Adaptation Protocol (LWAAP)—to coordinate higher-level packet control. However, when changing to a different set of endpoints, or otherwise switching between networks, a device will dis-associate from the previous access point and lose in-flight packets.

Thus, current solutions—in which one default gateway is used and dis-associating with a first network is performed before a second network is used—will often leave many packets in the "pipe" that are then lost at the previous access point. Generally, these packets will be retransmitted by the application (e.g., at the source node) to accomplish the user's original goal (e.g., downloading a file). These retransmissions both reduce throughput—effective user experience and reduce the overall network efficiency.

It has been shown that ICNs may make this switching between different technologies more seamless. For example, by removing the reliance on addresses for routing purposes, name-based routing may avoid having to establish a new address on each link, as well as prevent dropping of packets in-flight. However, the ICN transport is not currently optimized to handle this intermittent connectivity either. For example, even in ICNs, devices may switch completely to the new link on network changes, again possibly losing packets being routed to the old link in response to an original request (e.g., interest).

To address the issues noted above, several techniques are described herein to adjust the data link layer when switching between two networks, and to adjust the ICA transport layer, such as how to control the sending rate after a switch, without linking (e.g., co-locating or coordinating data flows through APs). Here, the efficiency of ICN network changes in heterogeneous wireless networks is proved by reducing the number of packets that are lost during each hand over, and improving the ICN transport layer to increase its performance in the face of vastly different link capacities of the involved networks. Through these techniques, needless packet losses are avoided during network changes. Further, the network is able to adapt quickly and send the interest packets at the rate appropriate for each link, which improves the overall throughput. This improves the performance of all applications running on the device and overall network performance, affecting other devices as well. As available link capacity is used more efficiently, deployment cost for network providers may be reduced.

FIG. 1 is a block diagram of an example of an environment 100 including a system for ICN heterogeneous wireless switching, according to an embodiment. The environment 100 includes several vehicles, including vehicle 105. Vehicle 105 is wirelessly connected to the mmWave network 110 and a dedicated short-range communication (DSRC) network 115. As illustrated, dashed connections are wireless and solid connections may be either wired or wireless.

The router 120 provides ICN routing for the AP of the network 110, and the router 125 provides ICN routing for the AP of network 115. The router 120 and the router 125 are connected to each other, with the router 125 providing routes to servers 135 via a back haul network 130. As the vehicle 105 moves from one mmWave coverage to another mmWave coverage, it can use the DSRC network 115 for connectivity. This is one such example of possibly frequent network handovers. In the examples below, there is no need for the AP of the DSRC network 115 to communicate with the gNB (e.g., mmWave) of the network 110.

To reduce packet loss and latency during a network switch, after each network switch, the ICN layer of the mobile device (e.g., vehicle 105) switches its default forwarding path for sending interest packets to the new link. At the same time, the device keeps the earlier network connection as long as it is available to receive most or all of the data packets that are currently in-flight (e.g., on the way) in that path. In an example, the ICN transport layer distinguishes the link from which packets arrive. This prevents interference by packets from the earlier network on sending rate adaptation in the new network. In an example, when periodically switching between networks of the same type, the ICN transport layer records the connection state (e.g. the size of the congestion window) and re-uses some or all of the connection state whenever returning to a previous network. Additional details and examples are described below.

The following may be used to prevent packet loss in a prior network during network switching. Whenever a device moves out of the range of the high-speed network (e.g., mmWave network 110), it may switch to another available network (e.g., DSRC network 115). The switch is usually based on measurements of the wireless signal strength (e.g., signal-to-noise ratio (SNR), received signal strength (RSSI), etc.) and involves a change in the default route for both IP and ICN networks. If after the switch, a number of packets are still on the earlier path, these packets may be lost at the earlier access point if the client has already disconnected. This loss is primarily due to an inability to maintain two different transport layer connections over IP at the same time—the IP address may also change, leading to a break and then creation of a new TCP transport layer session. The number of lost packets may be calculated by multiplying the bottleneck bandwidth with the end-to-end delay, called the "bandwidth-delay product".

To address the lost packet issue, disconnection from the prior network is delayed until after most or all of the packets in the pipe are received from the previous access point or until the signal strength becomes so bad that the bit error rate makes successful packet reception unlikely. In an example, detecting whether the reception of in-flight packets to the prior AP is complete or the device is physically out of range, may be achieved by using an idle timeout that disconnects the AP only after a given time has elapsed without receiving a valid packet on a given interface. In an example, network switching may be initiated earlier (e.g., at a higher SNR threshold over the previous network and a lower SNR threshold for the target network) than in traditional heterogeneous networks. This enables a greater time period of dual connectivity to collect more in-flight packets in the previous network.

The following may be used to separate congestion adaptation for each network interface. Traditionally, the ICN transport layer uses one congestion window (cwnd) for interest traffic sent on all available network interfaces. Often, the transport layer is unaware of the forwarding path, because this information is generally moved up the network stack into an ICN strategy layer. This arrangement helps to avoid IP network problems with connection breakdowns after network changes. However, in this case, the arrangement may interfere with correct congestion window adaptation following a network switch.

For example, consider when a device switches from a high-speed (e.g., one gigabit-per-second (Gbps)) network to a lower-speed (10 Mbps) network using the switching technique above. The device may have switched to the low-speed network while still receiving data or acknowledgements from the high-speed network. These acknowledgements will then increase the cwnd to a value that is higher than the optimal for the low-speed network. This may lead to overly trill network queues and packet losses.

To address this issue, the ICN transport layer is configured to distinguish between the incoming interfaces. Further, packets from the previous network are excluded from for rate adaptation calculations even while accepting data from the previous network. This configuration involves a notification interface to inform the transport layer whether any given incoming data packet is received on the current primary outgoing interface or not. In an example, the interface is implemented as a bit flag or header field to each data packet. As these tags only exist on the device, the configuration does not require a change to the packet format that is transmitted outside of the device, maintaining compatibility with vanilla (e.g., traditional) ICN networks.

The following may be used to record and reuse transport states when switching to a previous network. A couple of approaches have been tried to adjust the congestion windows, and hence the sending rates, when switching to a new network. First, a more conservative approach—which is used by default in TCP/IP networks where a new socket is created—is to reset the TCP window size to a small initial value such as one and to move into a "slow start" phase. Here, the window size is increased until a threshold is met. This approach is safe in the sense that it prevents network congestion and works for links with unknown available capacity. However, it may be wasteful of network resources because the full network capacity allocated to the device is not being using during the slow start phase.

Second, a transport-agnostic approach which is used in some ICNs—keeps the same sending rate as in the earlier network. This happens when the transport layer is unaware that a network switch happened. This unawareness is useful for making network changes more seamless, but results in poor performance when the previous network link capacity strongly deviates from the new network link capacity. For example, when switching from a fast network to a slow network, the high cwnd may initially overload the link until the transport layer is able to slow down. When switching from a slow to a fast network (e.g., without going through a new slow start phase), it may take longer than necessary to adjust the rate up to reach the new link capacity, again resulting in wasted resources by not fully using allocated network link capacity.

To address this issue, transport metrics of previous networks are recorded and references when that network is used again. For example, assume the device has a record of the type of each network (e.g., mmWave, DSRC, cellular, etc.). Here, the device may use the link rate measured at the same previous network, or the same type of network as the previous network, as its initial congestion window for a new network of the same type. In an example, a fraction of the previous experience rate (e.g., 50%) may be used as the new cwnd to avoid unnecessary network congestion. In an example, from this fractional cwnd starting point, a slow-start phase may be used to adapt to potentially higher link capacity.

Figure 2:
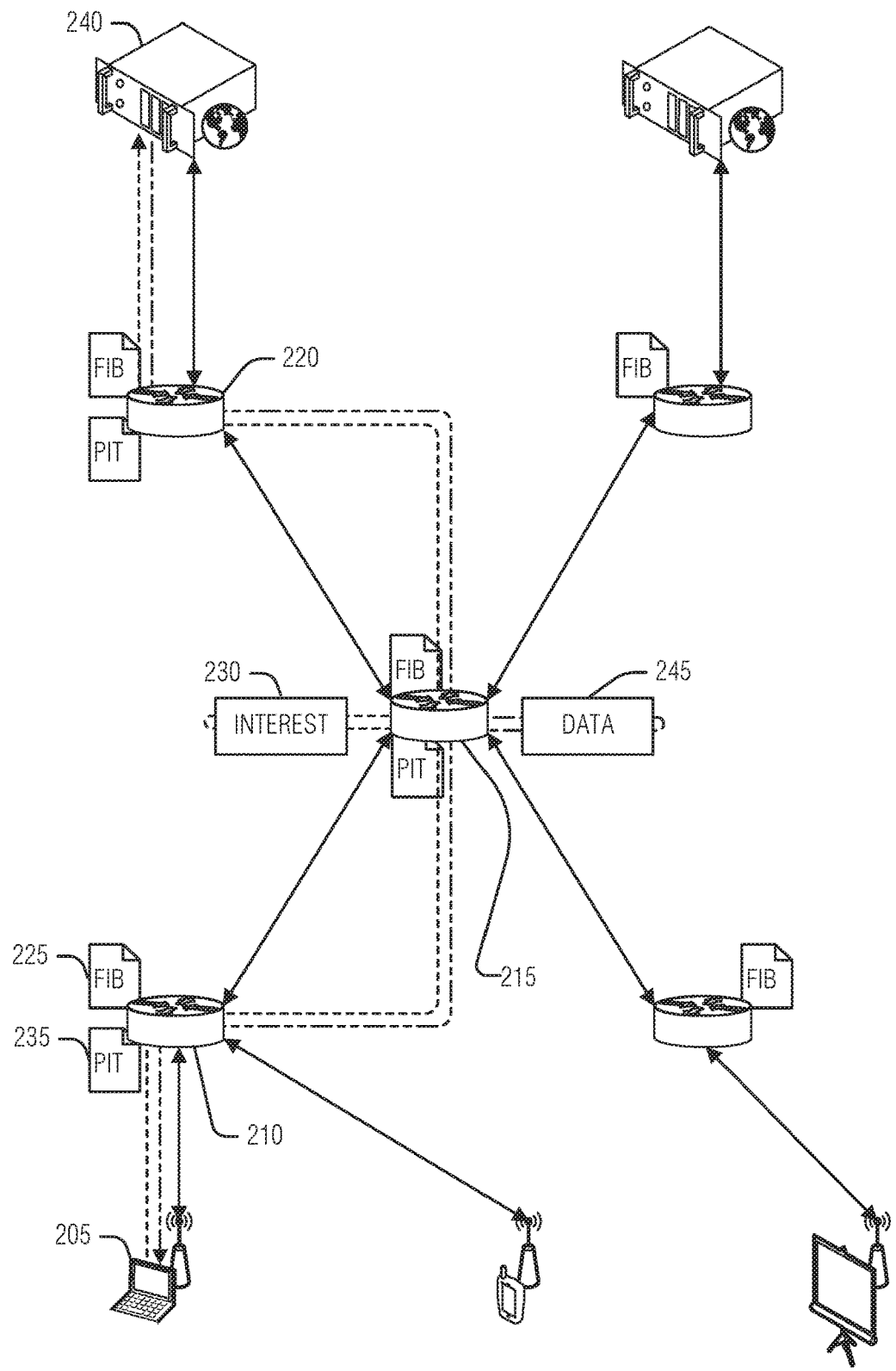
FIG. 2 illustrates an example ICN, according to an embodiment.

FIG. 2 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as is used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 205 (e.g., subscriber or consumer) requests named content from the network itself. The content request may be called an interest and transmitted via an interest packet 230. As the interest packet traverses network elements (e.g., routers)—such as network elements 210, 215, and 220—a record of the interest is kept, for example, in a pending interest table (PIT) 235 at each network element 210, 215, or 220. Thus, network element 210 maintains an entry in its PIT 235 for the interest packet 230, network element 215 maintains the entry in its PIT, and network element 220 maintains the entry in its PIT.

When a device, such as publisher 240, that has content matching the name in the interest packet 230 is encountered, that device 240 may send a data packet 245 in response to the interest packet 230. Typically, the data packet 245 is tracked back through the network to the source (e.g., device 205) by following the traces of the interest packet 230 left in the network element PITs. Thus, the PIT 235 at each network element establishes a trail back to the subscriber 205 for the data packet 245 to follow.

Matching the named data in an ICN may follow several strategies. Generally, the data is named hierarchically, such as with a universal resource identifier (URI). For example, a video may be named www.somedomain.com/videos/v8675309. Here, the hierarchy may be seen as the publisher, "www.somedomain.com," a sub-category, "videos," and the canonical identification "v8675309." As an interest 230 traverses the ICN, ICN network elements will generally attempt to match the name to a greatest degree (e.g., longest matching prefix). Thus, if an ICN element has a cached item or route for both "www.somedomain.com/videos" and "www.somedomain.com/videos/v8675309," the ICN element will match the later for an interest packet 230 specifying "www.somedomain.com/videos/v8675309." In an example, an expression may be used in matching by the ICN device. For example, the interest packet may specify "www-.somedomain.com/videos/v8675*" where is a wildcard. Thus, any cached item or route that includes the data other than the wildcard will be matched.

Item matching involves matching the interest 230 to data cached in the ICN element. Thus, for example, if the data 245 named in the interest 230 is cached in network element 215, then the network element 215 will return the data 245 to the subscriber 205 via the network element 210. However, if the data 245 is not cached at network element 215, the network element 215 routes the interest 230 on (e.g., to network element 220). To facilitate routing, the network elements may use a forwarding information base 225 (FIB) to match named data to an interface (e.g., physical port) for the route. Thus, the FIB 225 operates much like a routing table on a traditional network device.

In an example, additional meta-data may be attached to the interest packet 230, the cached data, or the route (e.g., in the FIB 225), to provide an additional level of matching. For example, the data name may be specified as "www.some-domain.com/videos/v8675309," but also include a version number or timestamp, time range, endorsement, etc. In this example, the interest packet 230 may specify the desired name, the version number, or the version range. The matching may then locate routes or cached data matching the name and perform the additional comparison of meta-data or the like to arrive at an ultimate decision as to whether data or a route matches the interest packet 230 for respectively responding to the interest packet 230 with the data packet 245 or forwarding the interest packet 230.

ICN has advantages over host-based networking because the data segments are individually named. This enables aggressive caching throughout the network as a network element may provide a data packet 230 in response to an interest 230 as easily as an original author 240. Accordingly, it is less likely that the same segment of the network will transmit duplicates of the same data requested by different devices.

Fine grained encryption is another feature of many ICN networks. A typical data packet 245 includes a name for the data that matches the name in the interest packet 230. Further, the data packet 245 includes the requested data and may include additional information to filter similarly named data (e.g., by creation time, expiration time, version, etc.). To address malicious entities providing false information under the same name, the data packet 245 may also encrypt its contents with a publisher key or provide a cryptographic hash of the data and the name. Thus, knowing the key (e.g., from a certificate of an expected publisher 240) enables the recipient to ascertain whether the data is from that publisher 240. This technique also facilitates the aggressive caching of the data packets 245 throughout the network because each data packet 245 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 3:
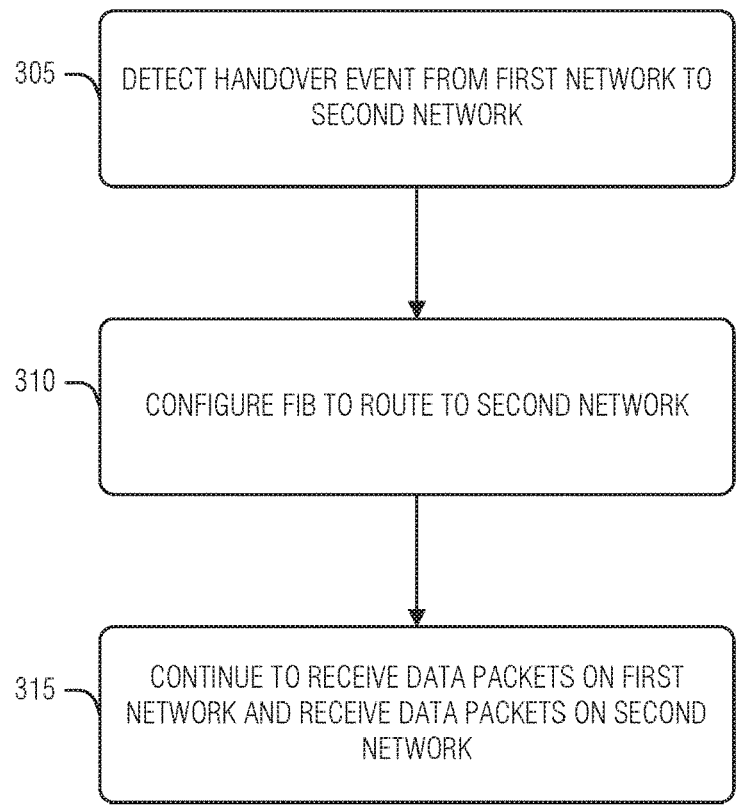
FIG. 3 is a flowchart of an example of a method for ICN heterogeneous wireless switching, according to an embodiment.

FIG. 3 is a flow chart of an example of a method 300 for ICN heterogeneous wireless switching, according to an embodiment. The operations of the method are performed by computational hardware, such as that described above or below (e.g., processing circuitry).

At operation 305, a handover event is detected. The handover event is based on metrics performed by a device (e.g., mobile phone, vehicle, etc.). Such metrics may include signal-to-noise ratio (SNR), bit-error-rate, etc. In an example, the handover event is an indication received from a base station, access point, or other infrastructure node. In an example, the handover event includes an indication for a device to switch from a first wireless link to a second wireless link. Here, the first network is the current, or old, network and the second network is the new, or future network.

At operation 310, a FIB is modified to route interest packets to the second wireless link. This modification provides the handover for the device into the second network by directing new interest packets generated by hardware and software on the device to the new network. Because the interest packets are now routed to the second wireless network, the data packets should track back through the second wireless network.

In an example, the method 300 is extended to include storing a sending rate record for the second wireless link based on link metrics from a previous connection of the device and the second wireless link. Here, the previous connection was at a different handover to the same wireless network. The storing will generally occur each time the device connects to any given network in order to maintain a current "best guess" at an efficient transmission rate for that network. In an example, the sending rate for the second wireless link is set based on the history (e.g., stored record) of performance with the second wireless link when the FIB is modified.

At operation 315, data packets are accepted on both the first wireless link and the second wireless link. Here, the device delays terminating its connection with the first wireless link even though its outbound transmissions are now directed to the second wireless link. This delay enables data packets responding to interest packets originally sent on the first wireless link to reach the device more quickly (e.g., avoiding re-transmission, forwarding to the second wireless link, etc.).

In an example, the link on which a given data packet is received by the device is recorded. This is useful to avoid having data rate, or other wireless performance metrics, of the first wireless link from tainting measurements for the second wireless link. Thus, in an example, the sending rate for the second wireless link is based solely on metrics from data packets received on the second wireless link.

In an example, the record (e.g., used to store the data packet received metrics) is a congestion window. Here, each wireless link (e.g., link one and two) have separate congestion windows. In an example, to adjust the sending rate for the second wireless link based on the record of a data packet arriving on the second wireless link and not the first wireless link, the congestion window specific to the second wireless link is used.

In an example, the method 300 is extended to include terminating the first wireless link in response to crossing a performance threshold. Thus, although the first network is maintained longer than traditional techniques, there may be a benefit—such as reductions in power, memory, or processing—in formally withdrawing from the first network. In an example, the performance threshold is a time period over which a valid data packet has not been received. For example, if five seconds have elapsed without a valid data packet, or since the last valid data packet, then the threshold is crossed. In an example, the performance threshold is a maximum bit-error-rate. In an example, the performance threshold is a minimum number of unfulfilled interest packets transmitted over the first wireless link. Here, the determination is based on resource use to maintain the first wireless link and efficiencies gained by preventing retransmission of data packets already in route to the first wireless link.

Figure 4:
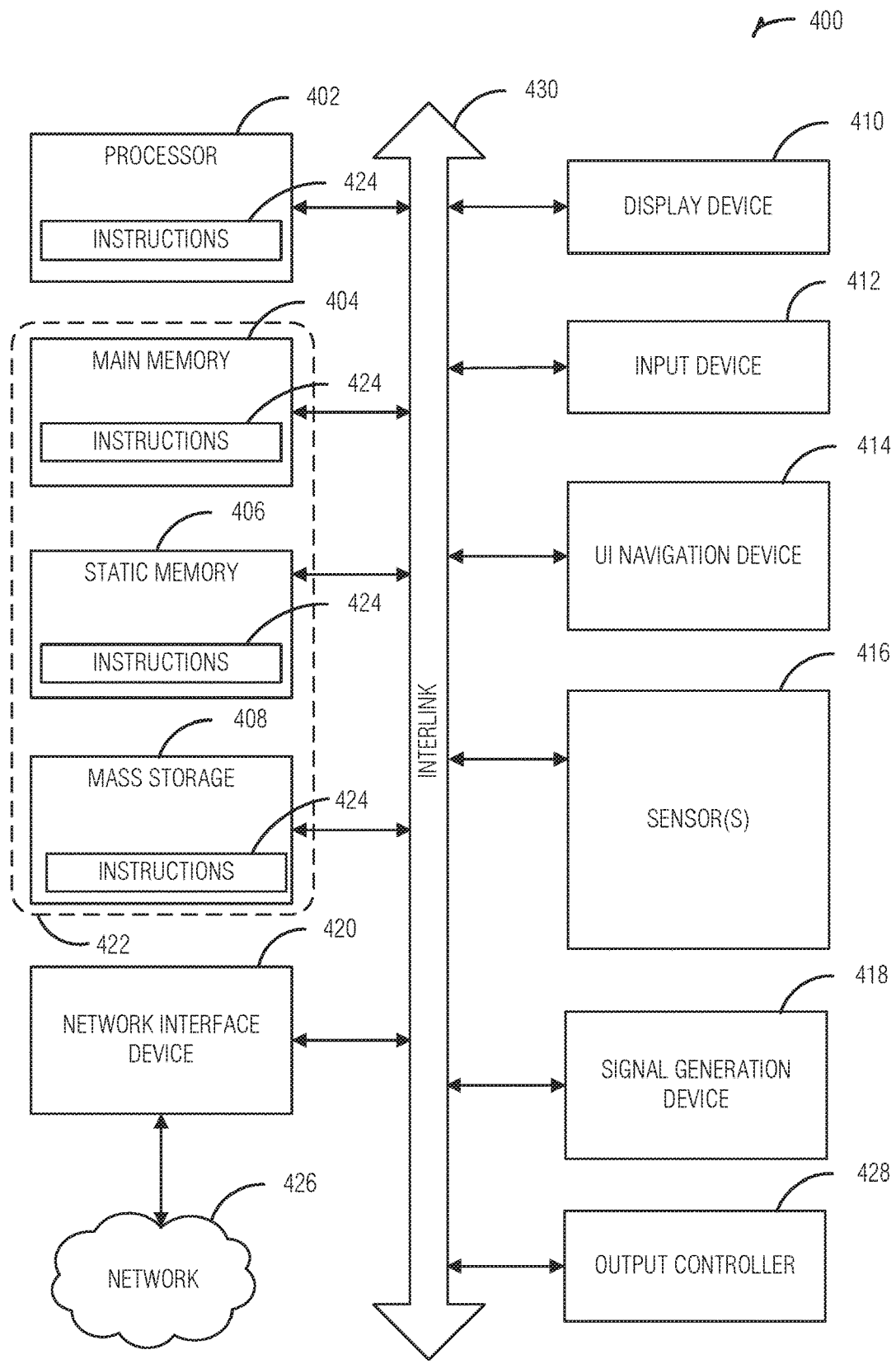
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. Examples, as described herein, may include, or may operate by, logic or a number of components, or mechanisms in the machine 400. Circuitry (e.g., processing circuitry) is a collection of circuits implemented in tangible entities of the machine 400 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 400 follow.

In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or, jointly execute a set (or multiple sets) of instructions to perform any one or more of the methodologies discussed herein, such as cloud computing, software as a service (SaaS), other computer cluster configurations.

The machine (e.g., computer system) 400 may include a hardware processor 402 (e.g., a central processing unit (CPU), a graphics processing unit (GPU), a hardware processor core, or any combination thereof), a main memory 404, a static memory (e.g., memory or storage for firmware, microcode, a basic-input-output (BIOS), unified extensible firmware interface (UEFI), etc.) 406, and mass storage 408 (e.g., hard drive, tape drive, flash storage, or other block devices) some or all of which may communicate with each other via an interlink (e.g., bus) 430. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 408, a signal generation device 418 (e.g., a speaker), a network interface device 420, and one or more sensors 416, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 402, the main memory 404, the static memory 406, or the mass storage 408 may he, or include, a machine readable medium 422 on which is stored one or more sets of data structures or instructions 424 (e.g., software) embodying or utilized by any one or more of the techniques or functions described herein. The instructions 424 may also reside, completely or at least partially, within any of registers of the processor 402, the main memory 404, the static memory 406, or the mass storage 408 during execution thereof by the machine 400. In an example, one or any combination of the hardware processor 402, the main memory 404, the static memory 406, or the mass storage 408 may constitute the machine readable media 422. While the machine readable medium 422 is illustrated as a single medium, the term "machine readable medium" may include a single medium or multiple media (e.g., a centralized or distributed database, and/or associated caches and servers) configured to store the one or more instructions 424.

The instructions 424 may configure the processor 402 to implement one or more support services, such as an operating system (OS), virtual machine (VM), function as a service (FAAS), or other facility. The support services may provide an application programing interface (API) to hardware of the machine 400, or may simulate hardware (e.g., a virtual processor, virtual network adapter, etc.), among other things.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may be further transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software. A transmission medium is a machine readable medium.

ADDITIONAL NOTES & EXAMPLES

Example 1 is a device for information centric network (ICN) heterogeneous wireless switching, the device comprising: a memory including instructions; and processing circuitry that, when in operation, is configured by the instructions to: detect a handover event, the handover event including an indication for a device to switch from a first wireless link to a second wireless link; modify a forwarding interest base (FIB) table to route interest packets to the second wireless link; and accept data packets on both the first wireless link and the second wireless link.

In Example 2, the subject matter of Example 1 includes, wherein, to accept data packets on both the first wireless link and the second wireless link, the processing circuitry is configured by the instructions to record on which wireless link any given data packet arrived.

In Example 3, the subject matter of Example 2 includes, wherein the processing circuitry is configured by the instructions to adjust a sending rate for the second wireless link based on a record of a data packet arriving on the second wireless link and not the first wireless link.

In Example 4, the subject matter of Example 3 includes, wherein the record is a congestion window, with each wireless link having separate congestion windows.

In Example 5, the subject matter of Example 4 includes, wherein, to adjust the sending rate for the second wireless link based on the record of a data packet arriving on the second wireless link and not the first wireless link, the processing circuitry is configured by the instructions to use the congestion window specific to the second wireless link.

In Example 6, the subject matter of Examples 1-5 includes, wherein the processing circuitry is configured by the instructions to store a sending rate record for the second wireless link based on link metrics from a previous connection of the device and the second wireless link.

In Example 7, the subject matter of Example 6 includes, wherein, to modify the FIB to route interest packets to the second wireless link, the processing circuitry is configured by the instructions to set a sending rate of the second wireless link based on the sending rate record.

In Example 8, the subject matter of Examples 1-7 includes, wherein the processing circuitry is configured by the instructions to terminate the first wireless link in response to crossing a performance threshold.

In Example 9, the subject matter of Example 8 includes, wherein the performance threshold is a time period over which a valid data packet has not been received.

In Example 10, the subject matter of Examples 8-9 includes, wherein the performance threshold is a maximum bit-error-rate.

In Example 11, the subject matter of Examples 8-10 includes, wherein the performance threshold is a minimum number of unfulfilled interest packets transmitted over the first wireless link.

Example 12 is a method for information centric network (ICN) heterogeneous wireless switching, the method comprising: detecting a handover event, the handover event including an indication for a device to switch from a first wireless link to a second wireless link; modifying a forwarding interest base (FIB) table to route interest packets to the second wireless link; and accepting data packets on both the first wireless link and the second wireless link.

In Example 13, the subject matter of Example 12 includes, wherein accepting data packets on both the first wireless link and the second wireless link includes recording on which wireless link any given data packet arrived.

In Example 14, the subject matter of Example 13 includes, adjusting a sending rate for the second wireless link based on a record of a data packet arriving on the second wireless link and not the first wireless link.

In Example 15, the subject matter of Example 14 includes, wherein the record is a congestion window, with each wireless link having separate congestion windows.

In Example 16, the subject matter of Example 15 includes, wherein adjusting the sending rate for the second wireless link based on the record of a data packet arriving on the second wireless link and not the first wireless link includes using the congestion window specific to the second wireless link.

In Example 17, the subject matter of Examples 12-16 includes, storing a sending rate record for the second wireless link based on link metrics from a previous connection of the device and the second wireless link.

In Example 18, the subject matter of Example 17 includes, wherein modifying the FIB to route interest packets to the second wireless link includes setting a sending rate of the second wireless link based on the sending rate record.

In Example 19, the subject matter of Examples 12-18 includes, terminating the first wireless link in response to crossing a performance threshold.

In Example 20, the subject matter of Example 19 includes, wherein the performance threshold is a time period over which a valid data packet has not been received.

In Example 21, the subject matter of Examples 19-20 includes, wherein the performance threshold is a maximum bit-error-rate.

In Example 22, the subject matter of Examples 19-21 includes, wherein the performance threshold is a minimum number of unfulfilled interest packets transmitted over the first wireless link.

Example 23 is at least one machine readable medium including instructions, the instructions, when executed by processing circuitry, cause the processing circuitry to perform operations comprising: detecting a handover event, the handover event including an indication for a device to switch from a first wireless link to a second wireless link; modifying a forwarding interest base (FIB) table to route interest packets to the second wireless link; and accepting data packets on both the first wireless link and the second wireless link.

In Example 24, the subject matter of Example 23 includes, wherein accepting data packets on both the first wireless link and the second wireless link includes recording on which wireless link any given data packet arrived.

In Example 25, the subject matter of Example 24 includes, wherein the operations comprise adjusting a sending rate for the second wireless link based on a record of a data packet arriving on the second wireless link and not the first wireless link.

In Example 26, the subject matter of Example 25 includes, wherein the record is a congestion window, with each wireless link having separate congestion windows.

In Example 27, the subject matter of Example 26 includes, wherein adjusting the sending rate for the second wireless link based on the record of a data packet arriving on the second wireless link and not the first wireless link includes using the congestion window specific to the second wireless link.

In Example 28, the subject matter of Examples 23-27 includes, wherein the operations comprise storing a sending rate record for the second wireless link based on link metrics from a previous connection of the device and the second wireless link.

In Example 29, the subject matter of Example 28 includes, wherein modifying the FIB to route interest packets to the second wireless link includes setting a sending rate of the second wireless link based on the sending rate record.

In Example 30, the subject matter of Examples 23-29 includes, wherein the operations comprise terminating the first wireless link in response to crossing a performance threshold.

In Example 31, the subject matter of Example 30 includes, wherein the performance threshold is a time period over which a valid data packet has not been received.

In Example 32, the subject matter of Examples 30-31 includes, wherein the performance threshold is a maximum bit-error-rate.

In Example 33, the subject matter of Examples 30-32 includes, wherein the performance threshold is a minimum number of unfulfilled interest packets transmitted over the first wireless link.

Example 34 is a system for information centric network (ICN) heterogeneous wireless switching, the system comprising: means for detecting a handover event, the handover event including an indication for a device to switch from a first wireless link to a second wireless link; means for modifying a forwarding interest base (FIB) table to route interest packets to the second wireless link; and means for accepting data packets on both the first wireless link and the second wireless link.

In Example 35, the subject matter of Example 34 includes, wherein the means for accepting data packets on both the first wireless link and the second wireless link include means for recording on which wireless link any given data packet arrived.

In Example 36, the subject matter of Example 35 includes, means for adjusting a sending rate for the second wireless link based on a record of a data packet arriving on the second wireless link and not the first wireless link.

In Example 37, the subject matter of Example 36 includes, wherein the record is a congestion window, with each wireless link having separate congestion windows.

In Example 38, the subject matter of Example 37 includes, wherein the means for adjusting the sending rate for the second wireless link based on the record of a data packet arriving on the second wireless link and not the first wireless link include means for using the congestion window specific to the second wireless link.

In Example 39, the subject matter of Examples 34-38 includes, means for storing a sending rate record for the second wireless link based on link metrics from a previous connection of the device and the second wireless link.

In Example 40, the subject matter of Example 39 includes, wherein the means for modifying the FIB to route interest packets to the second wireless link include means for setting a sending rate of the second wireless link based on the sending rate record.

In Example 41, the subject matter of Examples 34-40 includes, means for terminating the first wireless link in response to crossing a performance threshold.

In Example 42, the subject matter of Example 41 includes, wherein the performance threshold is a time period over which a valid data packet has not been received.

In Example 43, the subject matter of Examples 41-42 includes, wherein the performance threshold is a maximum bit-error-rate.

In Example 44, the subject matter of Examples 41-43 includes, wherein the performance threshold is a minimum number of unfulfilled interest packets transmitted over the first wireless link.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A network device for information centric network (ICN) heterogeneous wireless switching, the device comprising:
   a memory including instructions; and
   processing circuitry that, when in operation, is configured by the instructions
      detect a handover event, the handover event including an indication for the network device to switch from a first wireless link to a second wireless link;
      modify a forwarding interest base (FIB) table to route interest packets to the second wireless link only; and
      accept data packets on both the first wireless link and the second wireless link at the same time, data packets accepted on the first wireless link being in response to interests transmitted on the first wireless link and data packets accepted on the second wireless link being in response to interests transmitted on the second wireless link.

2. The network device of claim 1, wherein, to accept data packets on both the first wireless link and the second wireless link, the processing circuitry is configured by the instructions to record on which wireless link any given data packet arrived.

3. The network device of claim 2, wherein the processing circuitry is configured by the instructions to adjust a sending rate for the second wireless link based on a record of a data packet arriving on the second wireless link and not the first wireless link.

4. The network device of claim 3, wherein the record is a congestion window, with each wireless link having separate congestion windows.

5. The network device of claim 4, wherein, to adjust the sending rate for the second wireless link based on the record of a data packet arriving on the second wireless link and not the first wireless link, the processing circuitry is configured by the instructions to use the congestion window specific to the second wireless link.

6. The network device of claim 1, wherein the processing circuitry is configured by the instructions to store a sending rate record for the second wireless link based on link metrics from. a previous connection of the device and the second wireless link.

7. The network device of claim 6, wherein, to modify the FIB to route interest packets to the second wireless link, the processing circuitry is configured by the instructions to set a sending rate of the second wireless link based on the sending rate record.

8. The network device of claim 1, wherein the processing circuitry is configured by the instructions to terminate the first wireless link in response to crossing a performance threshold.

9. A method for information centric network (ICN) heterogeneous wireless switching, the method comprising:
   detecting a handover event, the handover event including an indication for a device to switch from a first wireless link to a second wireless link;
   modifying a forwarding interest base (FIB) table to route interest packets to the second wireless link only; and
   accepting data packets on both the first wireless link and the second wireless link at the same time, data packets accepted on the first wireless link being in response to interests transmitted on the first wireless link and data packets accepted on the second wireless link being in response to interests transmitted on the second wireless link.

10. The method of claim 9, wherein accepting data packets on both the first wireless link and the second wireless link includes recording on which wireless link any given data packet arrived.

11. The method of claim 10, comprising adjusting a sending rate for the second wireless link based on a record of a data packet arriving on the second wireless link and not the first wireless link.

12. The method of claim 11, wherein the record is a congestion window, with each wireless link having separate congestion windows.

13. The method of claim 12, wherein adjusting the sending rate for the second wireless link based on the record of a data packet arriving on the second wireless link and not the first wireless link includes using the congestion window specific to the second wireless link.

14. The method of claim 9, comprising storing a sending rate record for the second wireless link based on link metrics from a previous connection of the device and the second wireless link.

15. The method of claim 14, wherein modifying the FIB to route interest packets to the second wireless link includes setting a sending rate of the second wireless link based on the sending rate record.

16. The method of claim 9 comprising terminating the first wireless link in response to crossing a performance threshold.

17. At least one non-transitory machine readable medium including instructions, the instructions, when executed by processing circuitry, cause the processing circuitry to perform operations comprising:
   detecting a handover event, the handover event including an indication for a device to switch from a first wireless link to a second wireless link;
   modifying a forwarding interest base (FIB) table to route interest packets to the second wireless link only; and
   accepting data packets on both the first wireless link and the second wireless link at the same time data packets accepted on the first wireless link being in response to interests transmitted on the first wireless link and data packets accepted on the second wireless link being in response to interests transmitted on the second wireless link.

18. The at least one machine readable medium of claim 17, wherein accepting data packets on both the first wireless link and the second wireless link includes recording on which wireless link any given data packet arrived.

19. The at least one machine readable medium of claim 18, wherein the operations comprise adjusting a sending rate for the second wireless link based on a record of a data packet arriving on the second wireless link and not the first wireless link.

20. The at least one machine readable medium of claim 19, wherein the record is a congestion window, with each wireless link having separate congestion windows.

21. The at least one machine readable medium of claim 20, wherein adjusting the sending rate for the second wireless link based on the record of a data packet arriving on the second wireless link and not the first wireless link includes using the congestion window specific to the second wireless link.

22. The at least one machine readable medium of claim 17, wherein the operations comprise storing a sending rate record for the second wireless link based on link metrics from a previous connection of the device and the second wireless link.

23. The at least one machine readable medium of claim 22, wherein modifying the FIB to route interest packets to the second wireless link includes setting a sending rate of the second wireless link based on the sending rate record.

24. The at least one machine readable medium of claim 17, wherein the operations comprise terminating the first wireless link in response to crossing a performance threshold.

* * * * *

UNITED STATES PATENT AND TRADEMARK OFFICE
CERTIFICATE OF CORRECTION

PATENT NO. : 10,939,331 B2  
APPLICATION NO. : 16/370098  
DATED : March 2, 2021  
INVENTOR(S) : Schneider et al.

Page 1 of 1

It is certified that error appears in the above-identified patent and that said Letters Patent is hereby corrected as shown below:

In the Claims

In Column 15, Line 7, in Claim 1, after "instructions", insert --to:--

In Column 15, Line 43, in Claim 6, delete "from." and insert --from-- therefor

In Column 16, Line 26, in Claim 16, delete "9" and insert --9,-- therefor

In Column 16, Line 39, in Claim 17, delete "time" and insert --time,-- therefor

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*